United States Patent

Suzuki et al.

[11] Patent Number: 5,598,301
[45] Date of Patent: Jan. 28, 1997

[54] METHOD AND APPARATUS FOR TRANSFERRING DATA BETWEEN A COMPUTER AND A TAPE RECORDER

[75] Inventors: Hideto Suzuki; Takayuki Horikoshi, both of Kanagawa, Japan

[73] Assignee: Sony Corporation, Tokyo, Japan

[21] Appl. No.: 502,861

[22] Filed: Jul. 14, 1995

Related U.S. Application Data

[63] Continuation of Ser. No. 174,412, Dec. 28, 1993, abandoned.

[30] Foreign Application Priority Data

Dec. 31, 1992 [JP] Japan .................................. 4-360622

[51] Int. Cl.$^6$ .............................. G11B 5/09; G11B 27/36
[52] U.S. Cl. ............................................. 360/53; 360/31
[58] Field of Search ................................ 360/53, 31, 48

[56] References Cited

U.S. PATENT DOCUMENTS

| | | | |
|---|---|---|---|
| 4,873,589 | 10/1989 | Inazawa et al. | 360/32 |
| 4,899,232 | 2/1990 | Odaka et al. | 360/48 |
| 5,239,424 | 8/1993 | Hasegawa et al. | 360/53 |
| 5,267,100 | 11/1993 | Ichijo et al. | 360/53 |
| 5,313,341 | 5/1994 | Okihara et al. | 360/48 |
| 5,325,370 | 6/1994 | Cleveland et al. | 360/53 |

*Primary Examiner*—W. Chris Kim
*Attorney, Agent, or Firm*—Jay H. Maioli

[57] ABSTRACT

A recording/reproducing apparatus by which recording data can be retransferred and a bit error rate can be greatly improved by a simple arrangement. Recording data REC is transferred as well as stored in a record buffer 30 in which the recording data REC of the number of blocks corresponding to a simultaneous reproducing time is sequentially stored and when the recording data REC is retransferred, the recording data REC stored in the record buffer 30 is read and retransferred. Further, during reproduction, reproducing data PB is sequentially reproduced through the record buffer 30 however, when a retransfer which occurred during recording is detected in the reproducing data PB, the reproducing data is reproduced without passing through the record buffer 30.

4 Claims, 6 Drawing Sheets

METHOD AND APPARATUS FOR TRANSFERRING DATA BETWEEN A COMPUTER AND A TAPE RECORDER

This is a continuation of application Ser. No. 08/174,412 filed Dec. 28, 1993 abandoned.

BACKGROUND OF THE INVENTION

1. Field of the Invention

This invention relates to a recording/reproducing control apparatus and more particularly, is applicable to a data recorder as an external memory unit for computers.

2. Description of the Related Art

Conventionally, in this type of the magnetic recording/reproducing apparatus, there is proposed a data recorder composed of the ID-1 format by which desired data can be reproduced in a high density by sequentially and helically forming recording tracks onto a magnetic tape (ANSI x3.175–1990 19[mm] Type ID-1 Recorded Instrumentation).

Figure 1:
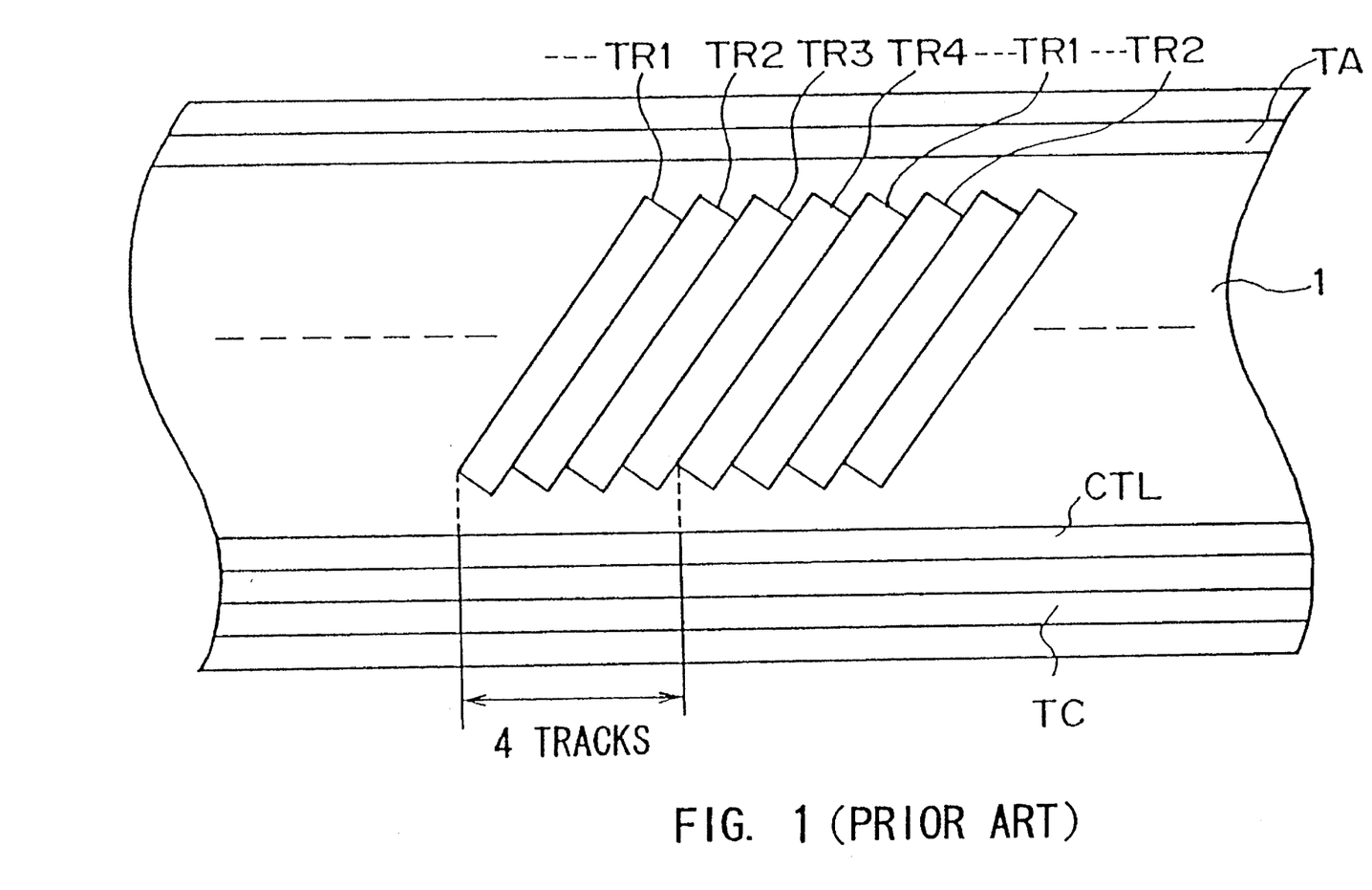
FIG. 1 is a schematic diagram for explaining the recording format composed of an ID-1 format on the magnetic tape.

More specifically, as shown in FIG. 1, this type of the data recorder is arranged such that a magnetic tape 1 is wound around a rotary drum rotating at a predetermined speed and caused to travel at a predetermined speed so that recording tracks TR (TR1, TR2, TR3, TR4, TR1, TR2, . . . ) are sequentially and helically formed by a magnetic head mounted on the rotary drum to thereby record desired data to the recording track TR1.

Further, at this time, the data recorder has recording tracks TA, CTL, TC formed at the upper and lower ends of the magnetic tape 1 and extending in the lengthwise direction thereof so that the track set identification data (ID) of the recording tracks TR is recorded to the recording track CTL.

Here, the track set ID is an absolute positional information starting from the leading head of the magnetic tape 1, is held between predetermined synchronizing signals and is recorded to the recording track TR at a 4-track cycle. Further, the recording tracks TA and TC can record user's management data and the like to thereby reproduce the recording tracks TA, CTL, TC so that data recorded to the recording track TR in a high density can be easily searched.

Figure 2:
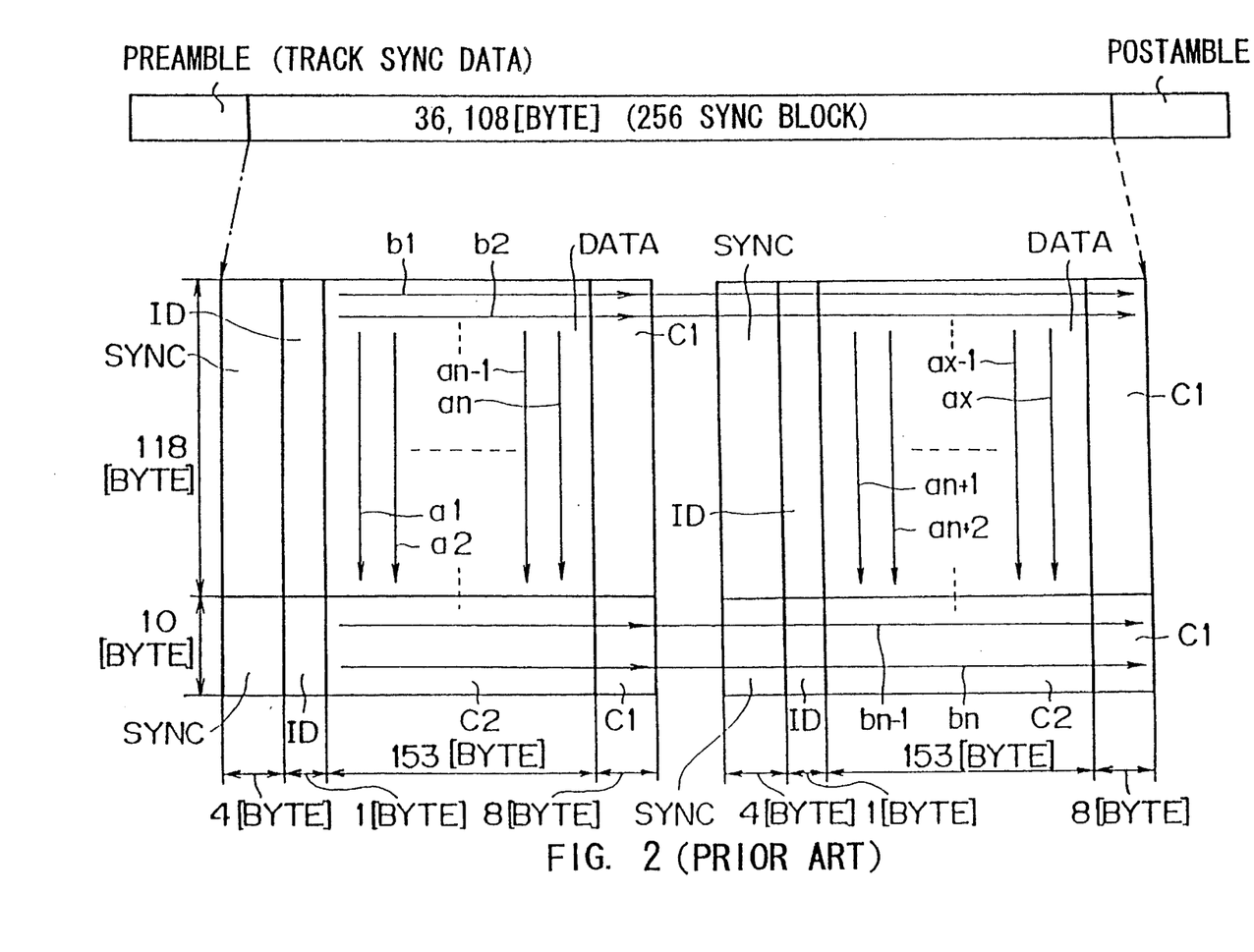
FIG. 2 is a schematic diagram for explaining the interleave processing of the ID-1 format.

Further, when data is recorded to the recording tracks TR, the data recorder records the data together with an error detection/correction parity code composed of a product code to thereby securely record and reproduce desired data. More specifically, as shown in FIG. 2, the data recorder fetches data DATA in a predetermined unit (=36,108[BYTE]) and then divides the data DATA into 306 blocks and adds a Reed-Solomon error detection/correction code (i.e., composed of a C2 code) to each block.

Further, after the block has been divided into first and second fields FIELD 0 and FIELD 1, the data recorder adds a Reed-Solomon error detection/correction code (i.e., composed of a C1 code) to each of the fields FIELD 0 and FIELD 1 so that the code C1 is perpendicular to the code C2. With this arrangement, the data recorder can improve a bit error rate by correcting the error of reproduced data by using the C1 and C2 codes when data is reproduced.

Further, when the data DATA added with the codes C1 and C2 as described above is recorded to the magnetic tape 1, the data recorder carries out an interleave processing to each recording track TR so that even if a drop out and the like are caused, the data DATA can be securely reproduced. More specifically, the data recorder records the data DATA input in the sequence of arrows a1, a2, . . . , an−1, an, an+1, an+2, . . . , ax−1, ax by changing the input sequence thereof as shown by arrows b1, b2, . . . , bn−1, bn so that the data DATA is interleaved.

Further, at this time, the data recorder records the data DATA which is added a synchronization signal SYNC and sync block data ID to each predetermined unit (hereinafter, referred to as a sync block), as well as preamble and postamble data as a whole. With this arrangement, when the data is reproduced, a magnetic recording/reproducing apparatus can reproduce the synchronization signal SYNC, the sync block data ID and the data DATA by using the track sync data contained in the preamble as a reference and carry out the data interleave processing by using the synchronization signal SYNC and sync block data ID as a reference.

Further, the execution of the data interleave processing can effectively prevent errors exceeding the error correction capability of the codes C1 and C2 from concentrating to one point even if the drop out and the like are caused.

Incidentally, the ID-1 format data recorder for recording/reproducing desired data as described above is arranged to ensure a bit error ratio of about b $10^{-10}$ which is sufficient in practical use mainly as a data recording/reproducing apparatus for measuring data. It is contemplated that if the bit error rate can be improved to about $10^{-15}$, this apparatus can be applied to the magnetic tape unit of computer systems used in, for example, banks and the like for the storage of very important data. Therefore, the merit obtained by using this type of the data recorder is improved and thus it can be applied to wider fields.

SUMMARY OF THE INVENTION

In view of the foregoing, an object of this invention is to provide a recording/reproducing control apparatus which is capable of enabling the retransfer of recording data by a simple arrangement and greatly improving a bit error rate.

The foregoing object and other objects of the invention have been achieved by the provision of a recording/reproducing control apparatus for transferring recording data as recording data REC sequentially added with block numbers BLNO in a block DB unit as well as monitoring reproducing data RAW input by being simultaneously reproduced when the recording data REC is recorded and when an error WER is detected in the reproducing data RAW, retransferring the recording data REC from the block number BLNO where the error WER is produced; there is also provided a record buffer means 30 for sequentially storing the recording data REC of the number of the blocks corresponding to the simultaneously reproducing time, wherein, at the time of recording, the recording data REC is transferred and simultaneously stored in the record buffer means 30 and when the recording data REC is retransferred, the recording data REC stored in the record buffer means 30 is read and retransferred.

Further, in the present invention, during reproduction, reproducing data PB is sequentially reproduced through the record buffer means 30; however, when the retransfer which occurred during recording is detected in the reproducing data PB, the reproducing data PB is reproduced without passing through the record buffer means 30.

In recording, since the recording data REC is transferred as well as stored in the record buffer means 30 in which the recording data REC of the number of the blocks corresponding to the simultaneous reproducing time is sequentially stored and when the recording data REC is retransferred, the recording data stored in the record buffer means 30 is read and retransferred, the recording data REC can be securely retransferred by a simple arrangement of only controlling the record buffer means.

Further, during reproduction, since the reproducing data PB is sequentially reproduced through the record buffer means 30 or, when the retransfer which occurred during recording is detected in the reproducing data PB, the reproducing data PB is reproduced without passing through the record buffer means 30, unnecessary data can be securely discarded by a arrangement of only controlling the record buffer means.

According to the present invention, the recording/reproducing control apparatus can be realized by which recording data can be securely retransferred by a simple arrangement of only controlling a recording buffer means such that, in recording, data is transferred as well as stored in a record buffer means in which the recording data of the number of blocks corresponding to a simultaneous reproducing time is sequentially stored and when the recording data is retransferred, the recording data stored in the record buffer means is read and retransferred.

Further, a recording/reproducing apparatus can be realized by which unnecessary reproducing data can be securely discarded by a simple arrangement of only controlling the record buffer means in such an arrangement that during reproduction, reproducing data is sequentially reproduced through the record buffer means as well as when a retransfer which occurred during recording is detected in the reproducing data, the reproducing data is reproduced without passing through the record buffer means.

With the above arrangement, a magnetic recording apparatus which is superior as an external memory device for a host computer system can be realized by greatly improving a bit error rate as a whole.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) General Arrangement (1-1) Arrangement of Computer System

Figure 3:
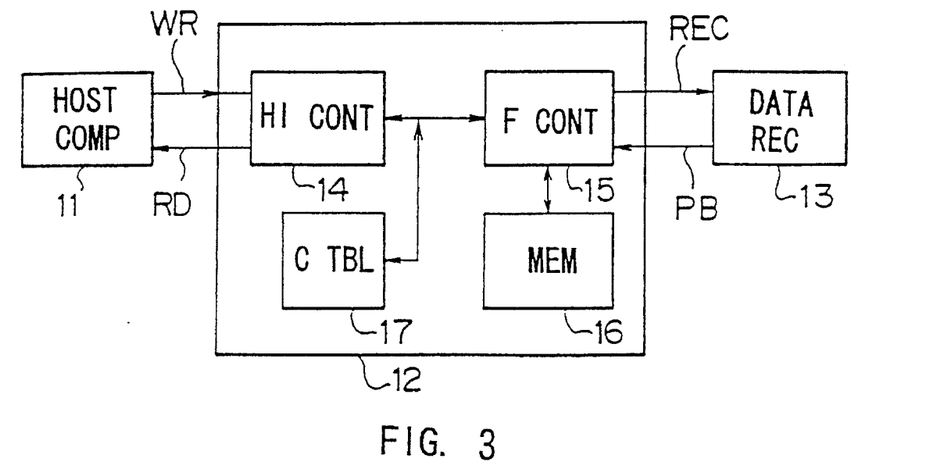
FIG. 3 is a block diagram showing the general arrangement of a computer system to which a magnetic recording method of the present invention is applied.

In FIG. 3, numeral 10 designates the schematic arrangement of a computer system to which the present invention is applied, in which write data WR transferred from a host computer 11 together with a write request is supplied to an ID-1 format data recorder 13 as a record data REC through a data recorder control device 12 so that the write data WR is written to the recording track on a magnetic tape 1 of the data recorder 13.

Further, the magnetic tape 1 of the data recorder 13 is reproduced in response to a read request input from the host computer 11 and resulting reproducing data PB is input to the host computer 11 as read data RD through the data recorder control device 12.

The data recorder control unit 12 is composed of a host interface control unit 14 and a format control unit 15. The host interface control unit 14 controls the channel interface between the data recorder control unit 12 and the host computer 11 and the format control unit 15 formats data to be supplied to and from the data recorder 13 by using a memory 16.

Further, control information is delivered between the host interface control unit 14 and the format control unit 15 with reference to a control table 17.

With this arrangement, the computer system 10 can use the data recorder 13 as an external memory unit for the host computer 11 by using the same interface as a conventional magnetic tape unit within the host computer 11 by the provision of the data recorder control device 12.

(1-2) Recording Area on Magnetic Tape

Figure 4A:
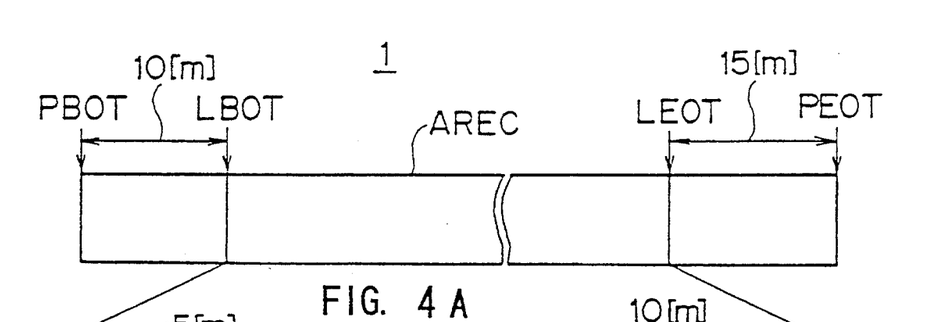
FIGS. 4A and 4B are schematic diagrams for explaining the recording areas on a magnetic tape.
Figure 4B:
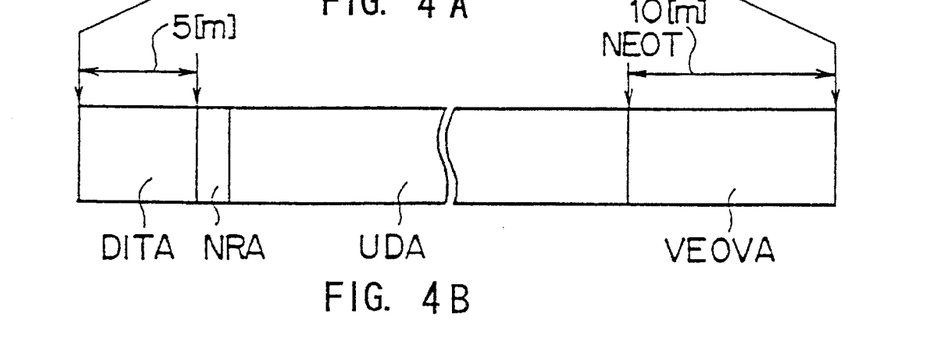

As shown in FIGS. 4A and 4B, the computer system 10 uses the central portion of the magnetic tape 1 loaded on the data recorder 13 as a recording area AREC because the central portion of the magnetic tape 1 in the lengthwise direction thereof has a relatively low degree of wear so that a bit error rate can be improved.

More specifically, as shown in FIG. 4A, a logical extreme end LBOT is set at the position located behind the physical extreme end PBOT of the magnetic tape 1 apart therefrom by, for example, 10 meters and a logical trailing end LEOT is set at the position located in front of the physical trailing end PEOT of the magnetic tape 1 apart therefrom by, for example, 15 meters, and the area from the logical extreme end LBOT to the logical trailing end LEOT is used as the recording area AREC.

As shown in FIG. 4B, in this recording area AREC, the area of, for example, 5 meters from the logical extreme end LBOT is used as a directory information track area DITA.

Further, the area which is continuous to the directory information track area DITA through a predetermined length of a non-recording area NRA and ended at a near to the end position NEOT is used as a user recording track area UDA, the near to the end position NEOT being located in front of the logical trailing end LEOT part therefrom by, for example, 10 meters, and further, the area from the near to the end position NEOT to the logical trailing end LEOT is used as a volume end information area VEOVA.

(1-3) Format of Recording Track

Figures 5A, 5B:
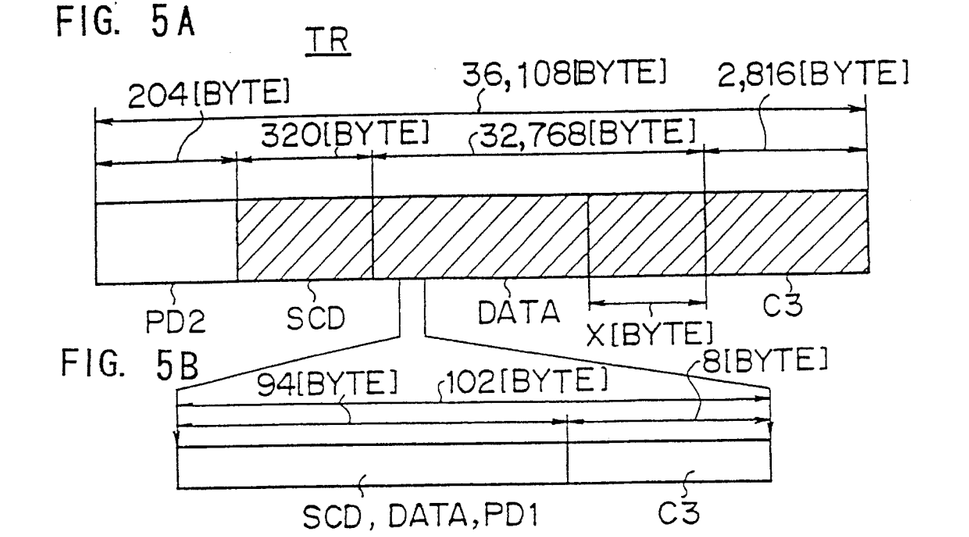
FIGS. 5A and 5B are schematic diagrams for explaining the format of the recording tracks on the magnetic tape.

The computer system 10 formats a user data area of 36,108 byte in one recording track prescribed by an ID-1 format as shown in FIGS. 5A and 5B and the formatted data is interleaved in a 4-track unit so that the bit error rate can be improved.

More specifically, as shown in FIG. 5A, the computer system 10 records the write data WR from the host computer 11 as 32,768 byte of the recording data DATA which is composed of, for example, one block per one recording track TR when 4 tracks are used as one set.

At this time, when the recording data DATA does not satisfy 32,768 byte in the one recording track, the data has added first supplementary data PD1 or X byte so that the data has 32,768 byte as a whole. Further, there is prepared subcode data SCD of 320 byte to store the accompanying information of the one recording track TR.

In addition to the aforesaid, as shown in FIG. 5A, the data recorder control device 12 is arranged such that a Reed Solomon error detection/correction code composed of 8 byte (hereinafter, referred to as a C3 code C3 in accordance with the codes C1, C2 in the ID-1 format) is added to each 94 byte of the subcode data SCD, recording data DATA and first supplementary data PD1 by using a predetermined creation polynomial. With this arrangement, errors can be better corrected so that the bit error rate can be further improved.

Figure 6:
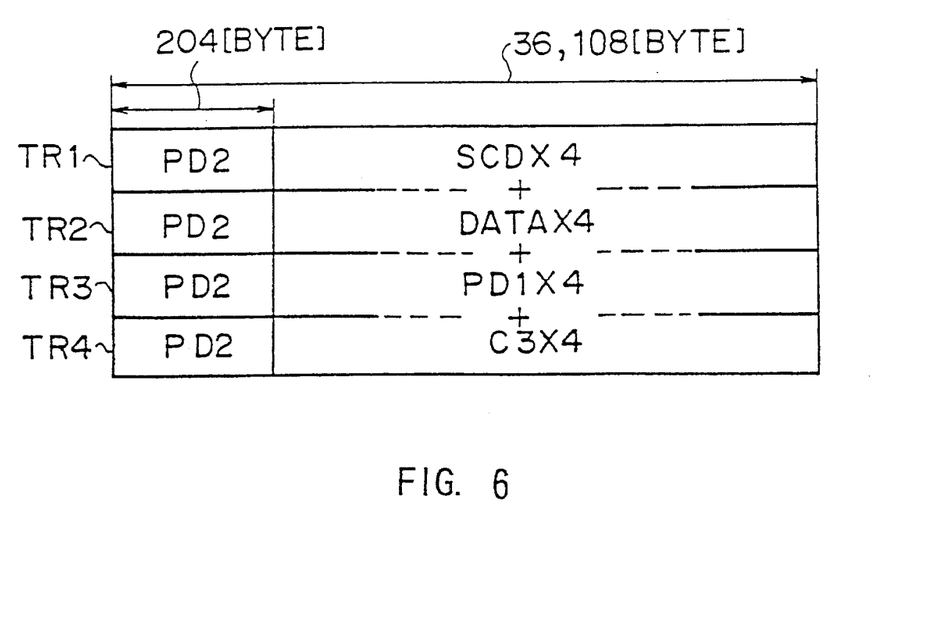
FIG. 6 is a schematic diagram for explaining an interleave processing between recording tracks.

Further, as shown in FIG. 6, with respect to the subcode data SCD, recording data DATA, first supplementary data PD1 and C3 code C3 formatted by using the one recording track as a unit, the data of the four recording tracks TR1, TR2, TR3, and TR4 are interleaved over the tracks by a predetermined method to thereby further improve the bit error rate.

Note, a second supplementary data PD2 of 204 byte is added to the leading head of each data of the one recording track interleaved with respect to the four recording tracks TR1, TR2, TR3, and TR4 as described above so that an amount of data for the one recording track TR becomes 36,108 byte prescribed by the ID-1 format as a whole.

Further, since the second supplementary data PD2 is formatted to the leading head, it can be assigned to the portion of the recording track into which a magnetic head is projected, where this portion of the recording track has a high degree of wear in the magnetic tape 1 itself the tracking was unstable. With this arrangement, the bit error rate of the recording data DATA can be further improved.

(1-4) Layout of Recording Track

Figure 7:
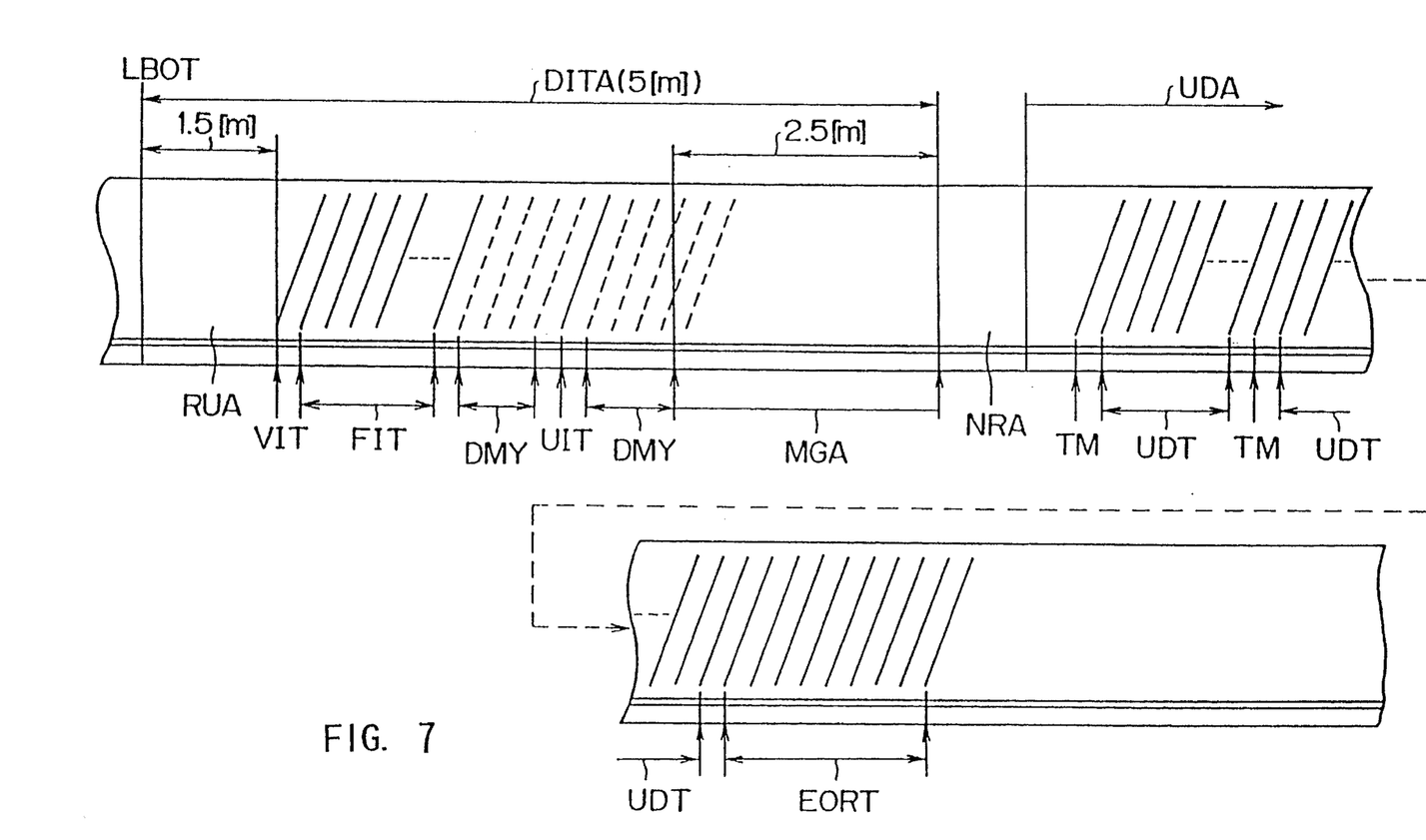
FIG. 7 is a schematic diagram for explaining the track format on the magnetic tape.

In the case of the computer system 10, as shown in FIG. 7, the accompanying information of the recording track to be stored in the subcode data SCD is composed of a track classification formation TRID indicating the classification of a corresponding recording track TR, block number BLNO to which the recording track TR belongs, file number FLNO to which the recording track TR belongs, the number of rewrites RWCT to the recording track TR, the number of writes/rewrites RTCT to the recording track TR, the number of bytes BYCT contained in the recording track, and the like.

Recorded to the track classification information TRID is the classification information of a volume information table VIT, file information table FIT, renewal information table UIT, dummy data track information DMY, user data track information UDT, data mark track information TM or end of record information EOR.

As shown in FIG. 7, the volume information table VIT, file information table FIT, renewal information table UIT or dummy data track information DMY is actually used as the track classification information TRID of the recording track TR formed to the directory information track area DITA of the magnetic tape 1.

A directory information table DIT for managing the file on the magnetic tape 1 as a whole is recorded to the directory information track area DITA. First, following to a rising-up region RUA having the length of 1.5 meters from the logical extreme end LBOT of the magnetic tape 1, the recording track composed of the volume information table VIT is recorded by four tracks composed of track sets.

Recorded to the recording data DATA of the volume information table VIT are the positional information of the leading head and trailing end of the data block recorded to the user record track area UDA by using the entire magnetic tape 1 as one volume, the length information of the file information table FIT and the block number of the data block to which write/rewrite has been executed at the time of recording.

Further, the file information table FIT is recorded to a 256 track file following the volume information table VIT. The information of the leading head position and block length of the file is recorded to the recording data DATA of the file information table FIT in the file unit recorded to the user record track area UDA.

Further, following the file information table FIT, the dummy data track information DMY is recorded in the predetermined number of tracks and then the renewal information table BIT is recorded to the following four tracks. Information indicating the presence/absence of renewal is recorded to the recording data DATA of the renewal information table UIT.

Note that, following the renewal information table UIT, the dummy data track information DMY is recorded to the recording track TR having the length of 2.5 meters from the leading head of the directory information track area DITA and the remaining directory information track area DITA having the length of 2.5 meters is reserved as a spare area MGA.

Next, the user data track information UDT, tape mark track information TM or end of record information EORT are used as the track classification information TRID of the recording track TR formed to the user record track area UDA following the directory information track area DITA of the magnetic tape 1 through the non-recording area NRA.

As the recording track TR of the user record track area UDA, the recording track TR of the user data track information UDT of a plurality of blocks for constituting one file by being held between the recording tracks of the mark track information TM using four tracks as one unit is recorded, and the recording track TR of the end of record information EORT is recorded following the end of the user data track information UDT.

Note that the first supplementary data PD1 of 32,768 byte is recorded to the recording data DATA of the tape mark track information TM and end of record information EORT; data corresponding to the write data WR input from the host computer 11 is recorded to the recording data DATA of the recording track of the user record track area UDA.

As described above, since the computer system 10 is arranged such that the directory information track area DITA is provided at the leading head of the magnetic tape 1 and the content of the user recording track area UDA is managed in a file unit, the data recorded to the data recorder 13 can be accessed in the same way an external memory unit from the standpoint of the host computer 11.

(2) Arrangement of Format Control Unit

Figure 8:
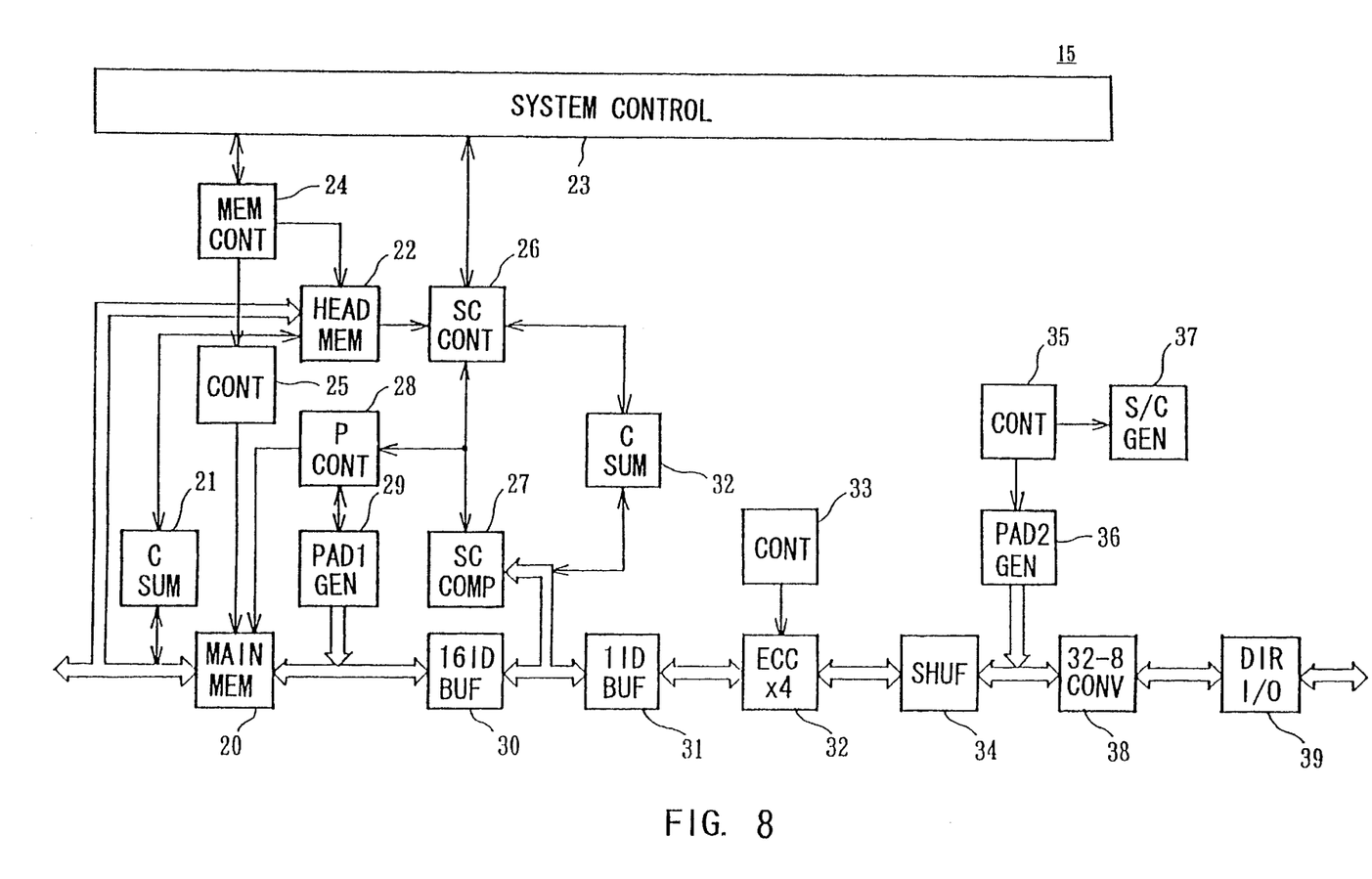
FIG. 8 is a block diagram showing the arrangement of a format control unit according to the present invention.

The format control unit 15 of the data control device 12 in this computer system 10 is arranged as shown in FIG. 8 together with the memory 16. More specifically, first, data is transferred to the host interface control unit 14 in a packet of 32 kbyte packet as a recording operation of the format control unit 15.

There is header information at the leading head of each packet to store the valid number of data, attributes and the like of the packet. Although the user data and header transferred from the host interface control unit 14 is composed of 32 kbyte, they are converted for a 64 bit bus in the format control unit 15 and an error correction code is added. With this arrangement, 1 bit can be corrected by the addition of an 8/64 error correction code and thus a memory for ECC can be reduced.

Further, header data is stored in a header memory 22 of a different system so that the kind of information stored in a main memory 20 can be searched from a memory control circuit 24. Further, the check sum of input user data is calculated in a check sum circuit 21 and stored in the header memory 22 together with the header information.

The main memory 20 is realized by operating a DRAM in a high speed page mode to compose a dual port memory having a large capacity and high speed. Since the high speed page mode operates by itself in response to a particular clock, FIFOs are mounted to both sides of the DRAM to accomplish the rate buffering between the clock used by the DRAM and an external clock.

The state of the main memory 20 is transferred to the memory control circuit 24, and when a buffer is full, the transfer carried out on the host interface control unit 14 side is stopped, and when the buffer is empty, the transfer of data to the data recorder 13 is stopped.

A subcode control circuit 26 reads from the header memory 22 the header data to user data which can compose a subcode to a next ID and determines what kind of a track must be arranged. When the arrangement of the next track has been determined, the information of the arrangement is written to a packet control circuit 28. The packet control circuit 28 reads user data from the main memory 20 or produces PAD1 data by controlling a PAD generation circuit 29 in accordance with the arrangement of the next ID obtained from the above information.

Data to be recorded is usually stored in a 16ID buffer 30 as well as added with a subcode generated by the subcode control circuit 26 in accordance with a header information and then transferred to an 1ID buffer 31 of a rear stage. In this embodiment, when an error is found in recording, a write-retry processing is carried out by using data stored in the 16ID buffer 30.

Further, when the subcode is added to the output from the 16ID buffer, the check sum calculated when transferred from the host interface control unit 12 is used to check whether the data read from the main memory 20 and to be written to the 1ID buffer 31 is the user data with which the subcode is intended to be added.

The C3 of the ID-1 format is encoded to the data read from the 1ID buffer 31 by using an encoder 32 having four systems and written to a shuffling RAM 34 so that the shuffling prescribed by the ID-1 format can be realized.

Data read from the shuffling RAM 34 is added with the PAD2 of the ID-1 format obtained from a PAD2 generation circuit 36 and then converted into a parallel signal of 8 bit so that it coincides with a DD-1 input format and output to the data recorder 13.

On the other hand, the reproducing operation of the format control unit 15 is arranged such that data transferred from the data recorder 13 is stored in the FIFO of a DIR I/O circuit so that it is organized with an internal operation and then converted into a signal of 32 bit which carries out an internal processing and written to the shuffling RAM 34. At this time, the unnecessary PAD2 data is discarded.

A signal string is restored to an original form by carrying out shuffling reverse to that carried out on the encode side from the shuffling RAM 34 and then the signal is decoded by using the decoder having four systems and written to the 1ID buffer 31. A small timing generation circuit can be used by carrying out these processings substantially in synchronism with a timing used on the encoder side.

The subcode portion of a signal read from the 1ID buffer 31 is transferred to the subcode control circuit 26 to analyze what data is read from the tape. At this time, the check sum of the user data is calculated by the check sum circuit 40 and transferred to the subcode control circuit 26. The user data is stored in the 16ID buffer 30.

With the data read from the tape, the write-retry processing may be required at any time. Thus, reproduced data is stored in the 16ID buffer 30, and when the requirement for the write-retry occures within the 16ID, such as with a processing for making the data in the 16ID buffer 30 invalid is carried out.

With this arrangement, only the data which is output from the 16ID buffer 30 and valid is indicated to the packet control circuit 28 and stored in the main memory 20. This processing enables the main memory 20 to store only the valid data at all times. When the data in the main memory 20 is searched, the memory control circuit 24 searches the header memory 22 to confirm whether or not relevant data exists.

The data of the main memory 20 is transferred to the memory control circuits 24, and when the buffer is full, a data transfer from the data recorder 13 is stopped, and when the buffer is empty, a transfer on the host interface control unit 14 side is stopped.

The header information is fetched from the header memory 22 in response to a data transfer request from the host interface control unit 14 and then the user data from the main memory 20 is organized and the data is transferred to the host interface control unit 14.

As described above, the format control unit 15 interposed between the host interface control unit 14 and the data recorder 13 converts a signal transferred from the host computer 11 into the ID-1 format prescribed by ANSI and records the same to the data recorder 13, and also transfers data reproduced from the data recorder 13 to the host computer 11.

(3) Write-retry Processing

First, a processing executed at the time of recording will be described as a write-retry in the format control unit 15. Usually, the subcode control circuit 26 confirms the content in the main memory 20 based on the header information stored in the header memory 22 to determine whether data must be transferred from the main memory 20 or the PAD1 must be used. Although selected data is transferred to the 1D buffer 31, it is also stored in the 16ID buffer 30 to prepare for the case in which the write-retry occurs.

When an error is found here and the write-retry is to be carried out, it can be carried out by using the data stored in the 16ID buffer 30. At this time, the 16ID buffer 30 serves as a ring buffer so that it can output write-retry data even if the write-retry is carried out any time.

With the above processing, the main memory 20 can be controlled only in the case where the subcode control circuit 26 transfers user data when it is requested. Further, the processing carried out by the subcode control circuit 26 when the write-retry is carried out is only to switch the data to be used to the output of the 16ID buffer.

On the other hand, at the time of reproduction, the subcode data is first transferred to the subcode control circuit 26 and the reproduction data is stored in the 16ID buffer 30. The subcode control circuit 26 determines whether the data stored in the 16ID buffer 30 is valid data, invalid data or abnormal data while observing the data stored in the 16ID buffer 30.

For example, when write-retry occurs in response to data supposed to be valid, the data covering from the data previously stored in the 16ID buffer 30 to the data at which the write-retry occurs is made invalid and new write-retry data becomes valid data. Further, data including an error when it is reproduced becomes abnormal data, and when write-retry for the data occurs, the data becomes invalid data.

As described above, the subcode control circuit 26 determines whether the output from the 16ID buffer 30 must be written to the main memory 20, discarded or processed as an abnormal output after the time of the 16ID and instructs the packet control circuit 28 to write only valid data to the main memory 20. With this arrangement, the main memory 20 stores all the valid data. Further, the main memory 20 can be very simply controlled because it is sufficient only to transfer data in response to an instruction from the subcode control circuit 26.

According to the above arrangement, the processings when data is write-retried, recorded and reproduced and the control of the main memory 20 can be separately executed by separately providing the 16ID buffer 30 for write-retry and the main memory 20. Since all the processings accompanied with the write-retry are carried out in the 16ID buffer 30 for the write-retry with this arrangement, only valid data exists in the main memory 20 at anytime, and thus management can be easily executed. Further, since the write-retry processing and the management of the main memory 20 are separately carried out as described above, respective processings are easily executed and thus the system is simply arranged as a whole.

(4) Other Embodiments (4-1) The above embodiment interleaves data in four tracks. However, the present invention is not only limited to this, but may interleave data in 8 tracks.

(4-2) The above embodiment is described with respect to the case where the present invention is applied to the external memory unit of a computer. However, the present invention is not only limited to this, but may be widely applied to various magnetic recording/reproducing apparatuses.

While the invention has been described in connection with the preferred embodiments of the invention, it will be obvious to those skilled in the art that various changes and modifications may be employed the appended claims cover all such changes and modifications as fall within the true spirit and scope of the invention.

What is claimed is:

1. A recording/reproducing control apparatus for transferring data to be recorded to a data recorder as recording data of sequentially added block number data in a block unit and monitoring reproducing data received from said data recorder simultaneously reproduced when the recording data is recorded, comprising:

a main memory for receiving from outside and storing the data to be recorded, for supplying the recording data, and during reproduction for storing and delivering to the outside reproduced data;

record buffer means for receiving the recording data supplied by said main memory, transferring the recording data to said data recorder, and simultaneously, sequentially storing the recording data of a number of said block units corresponding to a simultaneous reproducing time;

means for detecting an error in the reproducing data;

retransferring means for retransferring, when during recording an error is detected in the reproducing data, the recording data stored in said record buffer means to said data recorder starting from the data designated by a block number at which the error occurred, without affecting the operation of said main memory; and means for detecting, during reproduction, a retransfer processing which occurred during recording of the reproduced data, wherein during reproduction, the reproduced data is sequentially obtained by said main memory through said record buffer means, except when the retransfer processing which occurred during recording is detected in the reproduced data, the reproduced data is discarded without being passed from said record buffer means to said main memory.

2. A recording/reproducing apparatus to claim 1, wherein said record buffer means includes a ring buffer memory having a memory capacity sufficient for storing at least all of the data transferred between when an error occurs through when the error is detected, so that retransfer processing and reproduction processing can be executed.

3. A recording/reproducing apparatus according to claim 1, further comprising subcode control means for adding subcode data representative of data validity to the data to be recorded which is designated by the block number during recording, and for controlling the transfer between said record buffer means and said main memory based on the data validity of said subcode data during reproduction.

4. A method for controlling a record/reproduction function of a data recording means, comprising the steps of:

storing data to be recorded in a main memory means;

transferring the data stored in said main memory means to a record buffer means which sequentially stores said recording data of a number of block units corresponding to a simultaneous reproducing time;

transferring sequentially the data stored in said record buffer means to said data recording means while adding block number data in a block unit and monitoring reproducing data received from said data recording means simultaneously reproduced when the recording data is recorded;

detecting whether an error occurs in the reproducing data simultaneously reproduced in recording;

retransferring the recording data stored in said record buffer means to said data recording means starting from the data designated by the block number where an error occurred, when an error is detected in the reproducing data simultaneously reproduced in recording; and detecting, during reproduction, a retransfer processing which occurred during recording of the reproduced data, wherein during subsequent reproduction, reproduced data is sequentially reproduced through said record buffer means, except when a retransfer processing which occurred in recording is detected in the reproduced data, the reproduced data is discarded without being passed from said record buffer means to said main memory means.

* * * * *